United States Patent [19]

Buckles

[11] Patent Number: 4,951,265
[45] Date of Patent: Aug. 21, 1990

[54] OIL FILL PROCEDURE FOR SEISMIC MARINE STREAMER

[75] Inventor: John J. Buckles, Dallas, Tex.

[73] Assignee: Mobil Oil Corporation, New York, N.Y.

[21] Appl. No.: 350,281

[22] Filed: May 11, 1989

Related U.S. Application Data

[63] Continuation-in-part of Ser. No. 133,965, Dec. 16, 1987, abandoned.

[51] Int. Cl.⁵ ............................................... G01V 1/00
[52] U.S. Cl. ....................................... 367/18; 367/154; 367/176; 174/101.5
[58] Field of Search .................. 181/110, 112; 137/15, 137/81.2; 367/15–20, 106, 130, 153, 154, 155, 156, 162, 166, 169, 171, 176; 174/101.5, 23 C, 25 R

[56] References Cited

U.S. PATENT DOCUMENTS

| | | | |
|---|---|---|---|
| 3,615,959 | 10/1971 | Nance | 367/130 |
| 3,888,710 | 6/1975 | Burk | 174/23 C |
| 3,900,543 | 8/1975 | Davis | 174/101.5 X |
| 4,733,379 | 3/1988 | Lopetina et al. | 174/101.5 |

FOREIGN PATENT DOCUMENTS 2145226  3/1985  United Kingdom ................. 367/20

OTHER PUBLICATIONS

Litton Resources Systems, LRS.-500 Streamer Cables Brochure, Litton Resource (1981) p. 1-7.

Primary Examiner—Brian S. Steinberger
Attorney, Agent, or Firm—Alexander J. McKillop; Charles J. Speciale; Charles A. Malone

[57] ABSTRACT

A method for reducing signal degradation in a foam covered hydrophone used in seismic marine streamers. Said method comprises purging the foam streamer body with a fluid which is at least partially miscible with an oil used to fill said foam body. Thereafter, said foam body is filled with oil by gravity-assistance. Said method substantially removes air trapped in said foam body thereby reducing said signal degradation. Fluids, which can be utilized include butane, carbon dioxide, and fluorocarbons.

21 Claims, 3 Drawing Sheets

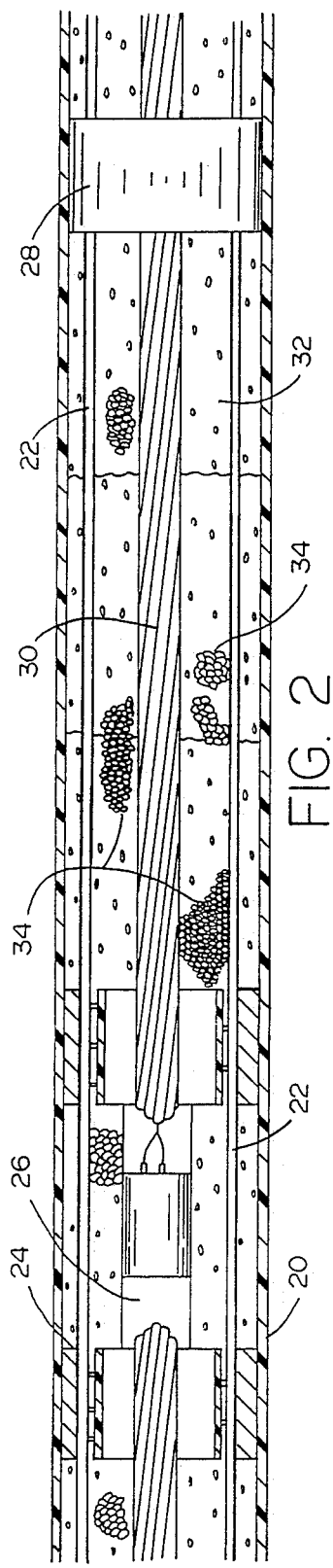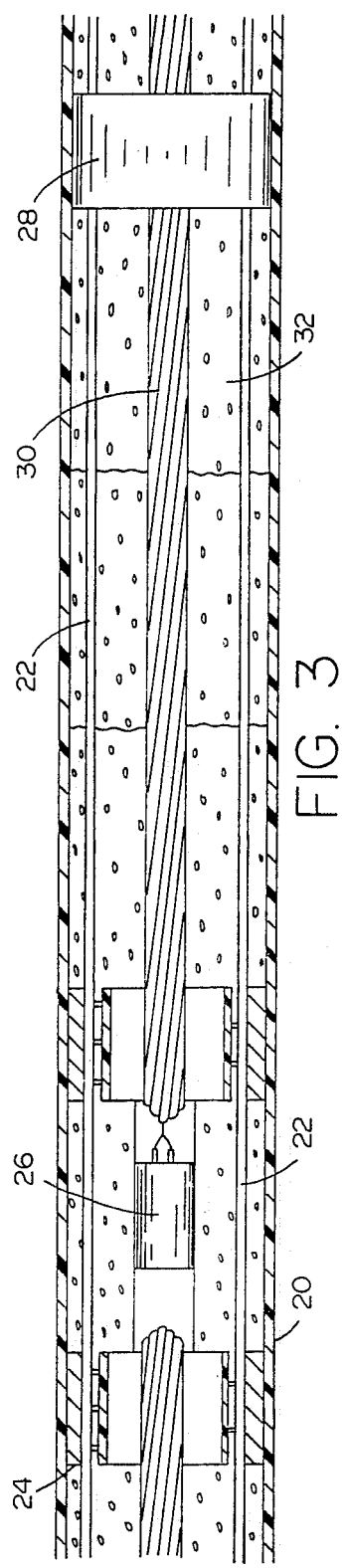
FIG. 2
FIG. 3

OIL FILL PROCEDURE FOR SEISMIC MARINE STREAMER

This application is a continuation-in-part of U.S. Ser. No. 133,965 filed Dec. 16, 1987, now abandoned.

FIELD OF THE INVENTION

This invention is directed to improvement of the signal quality received by hydrophones used in seismic marine exploration.

BACKGROUND OF THE INVENTION

New design seismic streamers presently used in seismic marine exploration have a surrounding plug of urethane foam around each of the hydrophones. This foam is effective in dampening noise in the signal. To further isolate the hydrophones from noise, the entire streamer body including the foam plugs, is filled with a highly refined oil, e.g., a kerosene-like cut. Due to imperfect displacement by the oil many air bubbles are retained by the foam plugs after filling with oil. These retained air bubbles are time consuming to remove. Presence of these air bubbles in the oil/foam surrounding the hydrophone sensors causes serious signal degradation. Because the streamer body is made of polyvinyl-chloride (PVC) and not designed to withstand differential pressure, the air cannot be evacuated nor can pressurized oil be used to fill the streamer.

Therefore, what is needed is a method to effectively remove air bubbles entrained in oil/foam surrounding the hydrophone sensors so as to avoid serious signal degradation.

SUMMARY

This invention is directed to a method for improving the signal quality in urethane foam mounts utilized on hydrophones in conjunction with a seismic streamer. Said urethane foam is purged with a fluid miscible with a hydrocarbonaceous liquid, which liquid is used to dampen noise in a hydrophone. Afterwards, said seismic streamer is filled with said hydrocarbonaceous fluid in an amount sufficient to remove air therefrom. Removal of air from said streamer substantially isolates said hydrophone from noise and improves signal quality during off-shore seismic explorations.

It is therefore an object of this invention to improve sweep efficiencies during oil-filling from a typical value of 20% to about 100%.

It is a further object of this invention to improve hydrophone signal quality by eliminating air in the urethane foam surrounding said hydrophone.

It is a yet further object of this invention to reduce the time required for removing air from urethane foam mounts for hydrophones.

It is a yet still further object of this invention to maintain the neutral buoyancy of the streamer in local seawater after oil-filling said streamer.

BRIEF DESCRIPTION OF THE DRAWINGS

FIG. 2 depicts a sectional view of a urethane foam seismic streamer having air bubbles therein prior to purging.

FIG. 3 depicts a sectional view of a urethane foam seismic streamer where the air bubbles have been removed after purging.

DESCRIPTION OF THE PREFERRED EMBODIMENTS

Figure 1:
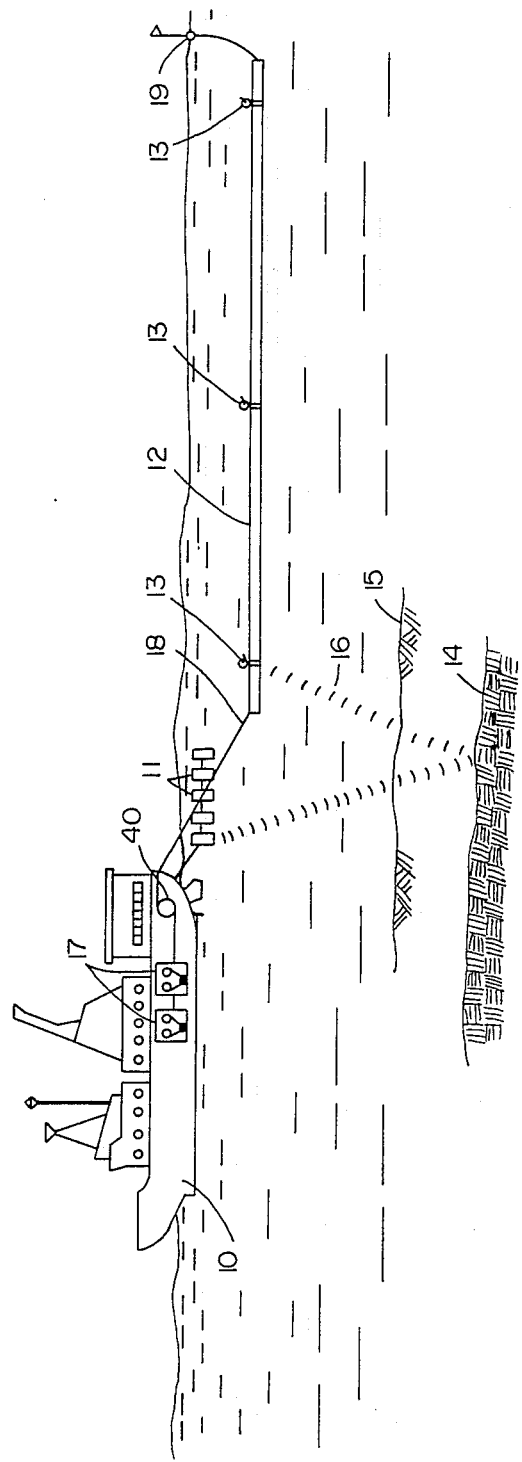
FIG. 1 depicts a vessel having a urethane foam seismic streamer in tow which streamer is attached to a winch or spool.

Referring to FIG. 1, a seismic marine exploration vessel 10 is shown traversing a line of exploration. Vessel 10 tows one or more seismic energy sources 11 and a seismic streamer 12. This streamer contains a plurality of hydrophones spaced along the length of the streamer. Seismic energy is generated in the water by source 11. Reflections 16 of this energy from subsurface formation 14 proceed through water bottom 15. These reflections are detected by the plurality of hydrophones along streamer 12 as seismic reflection signals. These seismic signals are transferred to data recording and processing equipment 17 on vessel 10 via electrical wiring through streamer 12 and up streamer tow cable 18. Depth control devices 13 are used to control the depth of the streamer. Tail buoy 19 marks the location of the streamer's end.

FIG. 2 depicts a cross sectional view of a portion of the streamer. The streamer's outside comprises a seamless polyvinyl-chloride hose wall 20. Next to hose wall 20 appears soft spacer 24. Strength is provided the streamer by internal strength member 22. Encased in open cell urethane foam mounts 32 is a hydrophone 26, intermediate spacer 28, and wire bundle 30. Air bubbles 34 are shown trapped in open cell urethane foam mounts 32.

Figure 4:
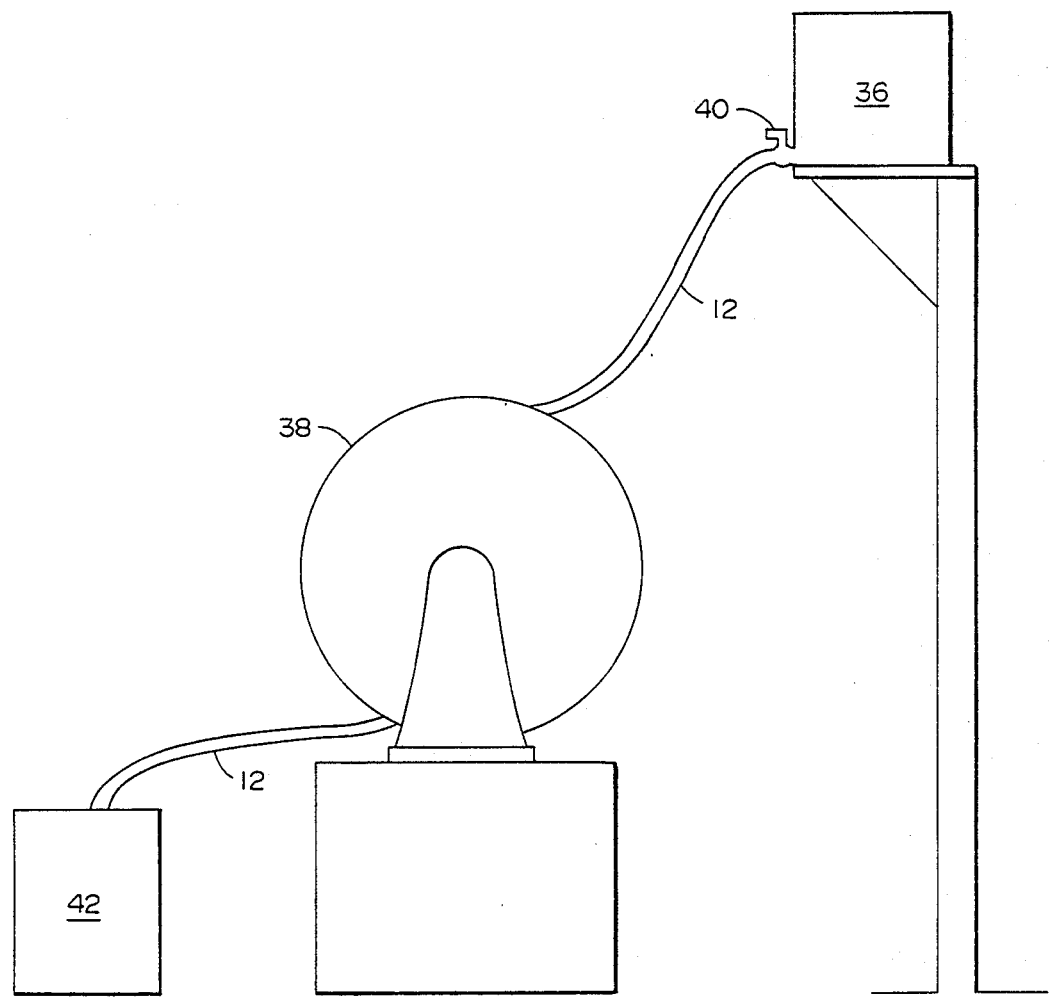
FIG. 4 is a schematic representation of a seismic streamer wound around a winch or spool and attached to a container while being gravity purged or filled.

FIG. 3 shows the effects of purging foam mounts 32 with the fluids below mentioned so as to remove air bubbles 34. As shown in FIG. 4, purge fluids miscible with a hydrocarbonaceous liquid used to dampen noise in a hydrophone flow by gravity into streamer 12 while wound around a winch or spool 38. To accomplish this, one end of streamer 12 is affixed to container 36. The other end of streamer 12 is affixed to container 42. Upon opening valve 40 fluids flow via gravity through streamer 12 from container 36 into container 42. Removing air in this manner is particularly useful when using oil pre-saturated with n-butane or when using oil containing a surfactant.

When pre-purging with a gas, as is shown in FIG. 4, valves 40 and 52 are closed. Closing these valves keeps fluids from flowing from containiner 36 into container 42. In order to purge streamer 12 with a gas, valves 54, 50 and 46 are opened which causes gas to flow from container 44 through streamer 12 into the atmosphere. These gases and other miscible fluids will be discussed later. Since the gases are under pressure in container 44, they will readily flow from container 44 by regulating the pressure. By controlling the pressure, damage to streamer 12 is minimized. After blowing the purge gas through the streamer, the body of the streamer is substantially filled with the gas, since the air has been completely displaced.

In the practice of this invention, urethane foam seismic streamers are purged with several pore volumes of n-butane at ambient conditions. Suitable streamers which can be utilized herein can be obtained from Crossline, Inc. located in Navasota, TX. Once purging is finished, the streamers are held in a substantially vertical position and filled with a hydrocarbonaceous liquid such as kerosene. Since the streamer is held in a substantially vertical position gravity causes the hydrocarbonaceous liquid to completely fill said streamer.

This downward gravity-fill displacement of the fluid or oil into the foam plugs around the hydrophones and into the streamer displaces the gaseous purge mixture entrained therein. When the streamers are used with a vessel to receive signals during marine exploration for hydrocarbonaceous fluids, substantially improved signal quality is obtained because the oil filled foam dampens out noise in the signal received by the hydrophone. Noise dampening is enhanced because substantially all of the air has been removed from the foam and displaced with oil. The hydrocarbonaceous fluid or oil used herein sustains about a 0.2% change in density. This minimal change in oil density is very beneficial and necessary since a neutral buoyancy of the oil filled streamer deployed behind the vessel is required. Foam seismic streamers and neutral buoyancy are discussed in U.S. Pat. No. 3,900,543 which issued to Billy W. Davis on Aug. 19, 1975. This patent is incorporated herein by reference. A substantial change in the oil's gravity would cause the streamer to become buoyed to an unsatisfactory level in the water, thereby causing inaccurate signal readings. To obtain an even greater reduction of the oil's density, the streamer can be flushed with additional volumes of the oil utilized. Oils which can be used herein include kerosene, jet fuel and other highly refined oil mixtures. Refined oil mixtures having a boiling point range from about 285° F. to about 410° F. are preferred.

Although this embodiment uses n-butane to purge the streamer and foam plugs, other miscible fluids can be utilized. Miscible fluids which can be used include carbon dioxide, Freon ® fluorocarbons, $C_1$-$C_4$ hydrocarbons, and mixtures of these. These gases are 100% miscible with air and will completely displace the air when sufficient gas is blown through the streamer.

Purging the streamer and foam plugs with n-butane or carbon dioxide to remove the air will result in improved air displacement. Sweep efficiencies should be about 100%. When n-butane is used for purging, the subsequent gravity-assisted oil-fill is substantially rapid and complete due to the low interfacial tension (IFT) and miscibility of n-butane in the oil. Carbon dioxide purging is expected to give a similar excellent sweep efficiency. However, carbon dioxide is less soluble in oil and will require a substantially longer time to fill said streamer and foam plugs. Use of either n-butane or carbon dioxide results in essentially a near-miscible or miscible displacement by the oil. An additional effect to the dissolution of gas into the oil is the lowered IFT between the gas and oil, as compared to gas and air, which allows the oil to simply displace (push) the gas out of the streamer easier than it could push out air. Even when the oil is presaturated with gas by bubbling gas through it, this effet is still present. For example, butane-saturated oil will displace butane gas much easier than plain oil will displace air. This is due to the lower IFT between oil/gas than between oil/air. In this embodiment, the main enhancement is an easier displacement rather than a dissolution.

In another effort to lower air/oil IFT, where a gas purge is unavailable, a surfactant was added to the oil. For this purpose petroleum sulfonate or a non-ionic surfactant can be utilized. A non-ionic surfactant which can be used is GAF DM-430 which is an anti-icing jet fuel additive highly soluble in oil. The surfactant is added to the oil before filling the streamer. Although slight gains were noted, these surfactants did not significantly lower the amount of air trapped or entrained in the oil despite the surfactants' solubility in the oil. However, this procedure is better than plain oil lacking a surfactant because it is easier for the air to be pushed out. Oil containing a surfactant can be used following a gas purge of the streamer.

The density of the oil must be carefully controlled (to within a few tenths of a percent) on the boat to give neutral buoyancy of the streamer in the local seawater. Therefore, the density change of one pore volume of the oil, used to fill a butane-purged foam plug, was accurately measured on a Mettler-Paar densitometer. Butane very slightly lowers the oil's density. Compared to fresh oil, this ratio was $$p/p' = 1.00213$$

(where p' is the density of the butane-bearing oil) or about two tenths of a percent decrease in oil density—likely acceptable for use in the streamer. This density change could be further reduced or eliminated by flushing additional pore volumes of fresh oil through the system after the initial fill. Also, the oil could be presaturated with n-butane before filling a butane-purged streamer such that its density would undergo no further change during filling. The lower density of butane-saturated oil could be compensated for by starting with one of the higher density grades of oil. Experiments done with butane-saturated oil have shown that a 100% sweep was still achieved although the process was much slower, with the butane being displaced out of the foam instead of dissolving in it. The density ratio of fresh oil to butane-saturated oil is $$p/p' = 1.03006$$

by measurement. (Literature values of butane solubility in kerosene could not be found, but that of butylene in kerosene is 15% by weight, probably near the value for butane.)

In order to verify the expected results with a streamer and foam plugs the following test was run.

% FILL EFFICIENCY (SWEEP) OF OIL

A pair of foam flow cells, similar to small bore core holders, were made to hold foam plugs for study of the oil flow through the foam. The porosity ($\phi$) of the foam was measured and determined to be 0.85. Sweep efficiency of the displacing oil was determined by the flow cell weight before and after the run. Downward gravity-fill displacements of the oil into the foam plugs (the fill procedure used on a seismic boat) confirmed the trapped air problem and typically resulted in only 20–24% of the air being displaced by the oil and leaving behind large pockets of air. The actual geometry of the streamer internals could not be duplicated in these experiments, and the sweep of the oil reported by the seismic crew on the boat is considerably higher than this, although still a problem.

| Run | Pre-Purge | Oil in System (Steady State) g (gm) | Oil Density (g/cc) p | Foam Porosity φ | Foam Cell Dia. (cm) d | Foam Cell Len. (cm) L | % Sweep g/pφπ(r 2)L |
|---|---|---|---|---|---|---|---|
| 1 | none | 4.81 | 0.743155 | 0.85 | 2.36 | 8.82 | 19.7% |
| 2 | none | 6.78 | 0.743155 | 0.85 | 2.55 | 8.72 | 24.0% |
| 3 | CO$_2$ | 25.64 | 0.743155 | 0.85 | 2.51 | 8.85 | 92.5% |
| 4 | butane | 32.82 | 0.741579 | 0.85 | 2.96 | 8.59 | 88.1% |
| 5 | butane | 28.33 | 0.741579 | 0.85 | 2.55 | 8.80 | 100.0% |
| 6 | butane | 28.44 | 0.72147 | 0.85 | 2.42 | 9.20 | 100.0% |
| 7 | none | 5.48 | 0.743155 | 0.85 | 2.35 | 8.94 | 22.3% |
| 8 | none | 6.68 | 0.743155 | 0.85 | 2.42 | 8.97 | 25.6% |
| 9 | none | 5.58 | 0.743155 | 0.85 | 2.42 | 8.97 | 21.4% |

*Comments:
Run 3 - oil was slow filling
Run 6 - oil was pre-saturated with n-butane
Run 7 - foam was pre-soaked with oil
Run 8 - 10% DM-430 surfactant placed in oil
Run 9 - 10% DM-430 surfactant placed in oil; foam pre-soaked with mixture.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed is:

1. A method for improving signal quality in urethane foam mounts utilized on hydrophones in conjunction with a seismic streamer comprising:
   (a) purging a urethane foam mount with a fluid miscible with air and a hydrocarbonaceous liquid having a selected density which liquid is used to dampen noise in a hydrophone where said fluid is a member selected from the group consisting of carbon dioxide, fluorocarbons, $C_1$–$C_4$ hydrocarbons, and mixtures thereof which member alone substantially displaces air from the streamer; and
   (b) thereafter filling said seismic streamer with said hydrocarbonaceous liquid which mixes with said fluid and substantially retains the density of said liquid thereby maintaining neutral buoyancy of said streamer, substantially isolating said hydrophones from noise, and improving signal quality.

2. The method as recited in claim 1 where the hydrocarbonaceous liquid is pre-saturated with n-butane before filling said streamer thereby avoiding a density change in said fluid.

3. The method as recited in claim 1 where in step (a) said hydrocarbonaceous liquid has a boiling point of from about 285° to about 410° F.

4. The method as recited in claim 1 where in step (a) said hydrocarbonaceous liquid is kerosene, kerosene pre-saturated with butane, and kerosene containing a surfactant.

5. The method as recited in claim 1 where in step (b) filling is accomplished by downwardly gravity-filling said streamer with said hydrocarbonaceous liquid.

6. The method as recited in claim 1 where step (b) is repeated thereby removing additional miscible fluid and increasing the density of the hydrocarbonaceous liquid so as to maintain the neutral buoyancy of said streamer.

7. The method as recited in claim 1 where after steps (a) and (b) substantially all air is removed from said streamer.

8. A method for improving signal quality in urethane foam mounts utilized on hydrophones in conjunction with a seismic streamer comprising:
   (a) purging a seismic streamer containing hydrophones mounted in urethane foam with a gas only for a time sufficient to substantially remove air from said streamer which gas is a member selected from the family consisting of methane, ethane, propane, butane, fluorocarbons, carbon dioxide, and mixtures thereof;
   (b) thereafter filling said streamer with a hydrocarbonaceous liquid having a selected density that displaces said gas thereby allowing said liquid to substantially retain the liquid's density and give neutral buoyancy to said streamer while substantially isolating said hydrophones from noise which results in improved signal quality.

9. The method as recited in claim 8 where said mounts are comprised of open cell urethane foam.

10. The method as recited in claim 8 where in step (b) said hydrocarbonaceous liquid has a boiling point of from about 285° to about 410° F.

11. The method as recited in claim 8 where in step (b) filling is accomplished by downwardly gravity-filling said streamer with said hydrocarbonaceous liquid.

12. The method as recited in claim 8 where step (b) is repeated thereby removing substantially all of said gas which increases the density of the hydrocarbonaceous liquid so as to maintain the neutral buoyancy of said streamer.

13. The method as recited in claim 8 where the hydrocarbonaceous liquid is pre-saturated with n-butane before filling said streamer thereby avoiding a density change in said fluid.

14. A method for improving signal quality in urethane foam mounts utilized on hydrophones in conjunction with a seismic streamer comprising:
   (a) purging a seismic streamer containing hydrophones mounted in urethane foam with a gas only for a time sufficient to substantially remove air from said streamer which gas is a member selected from the family consisting of $C_1$–$C_4$ hydrocarbons, fluorocarbons, carbon dioxide, and mixtures thereof; and
   (b) thereafter filling said streamer with a hydrocarbonaceous liquid, having a selected density which liquid contains a surfactant and displaces said gas thereby allowing the liquid to substantially retain its density which gives neutral buoyancy to said streamer while substantially isolating said hydrophones from noise which results in improved signal quality.

15. The method as recited in claim 14 where a nonionic surfactant is used in combination with kerosene, jet fuel, or mixtures thereof.

16. The method as recited in claim 14 where a nonionic surfactant is used in combination with a hydrocarbonaceous liquid having a boiling point of from about 285° to about 410° F.

17. The method as recited in claim 14 where said mounts are comprised of open cell urethane foam.

18. The method as recited in claim 14 where in step (b) said hydrocarbonaceous liquid has a boiling point of from about 285° to about 410° F.

19. The method as recited in claim 14 where in step (b) filling is accomplished by downwardly gravity-filling said streamer with said hydrocarbonaceous liquid.

20. The method as recited in claim 14 where step (b) is repeated thereby removing substantially all of said gas which increases the density of the hydrocarbonaceous liquid so as to maintain the neutral buoyancy of said streamer.

21. The method as recited in claim 14 where the hydrocarbonaceous liquid is pre-saturated with n-butane before filling said streamer thereby avoiding a density change in said fluid.

* * * * *